(No Model.)
W. H. McDONALD.
ELECTRIC STORAGE SYSTEM.
No. 389,935. Patented Sept. 25, 1888.
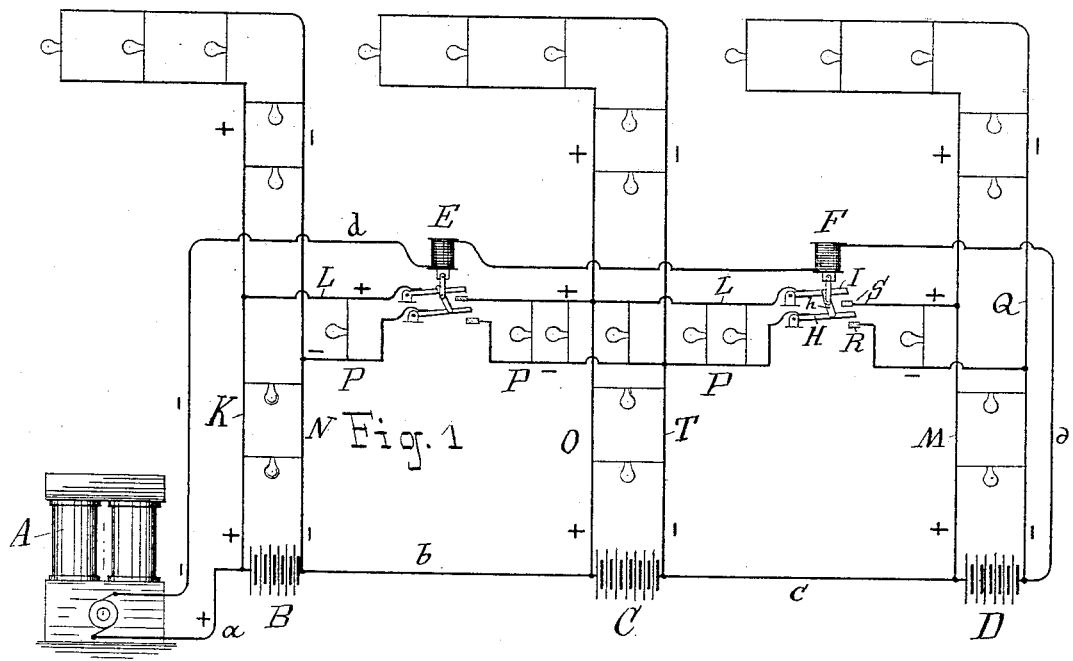
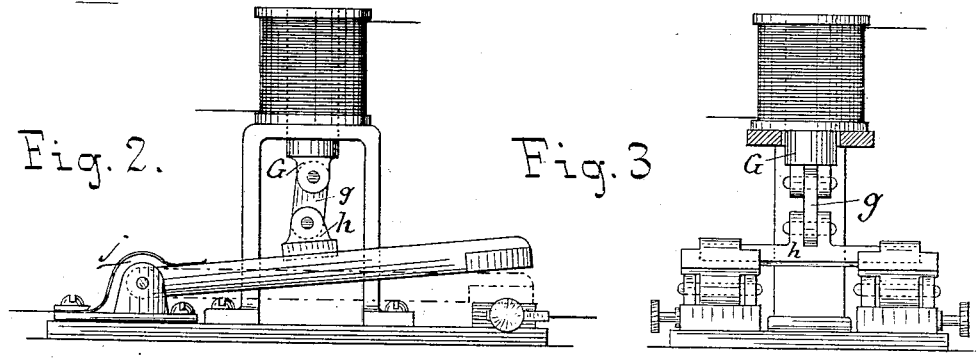
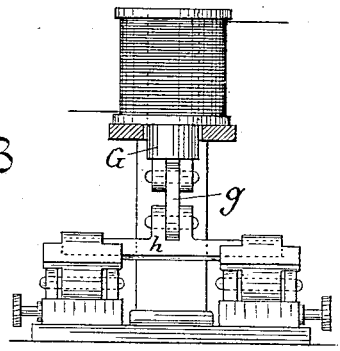
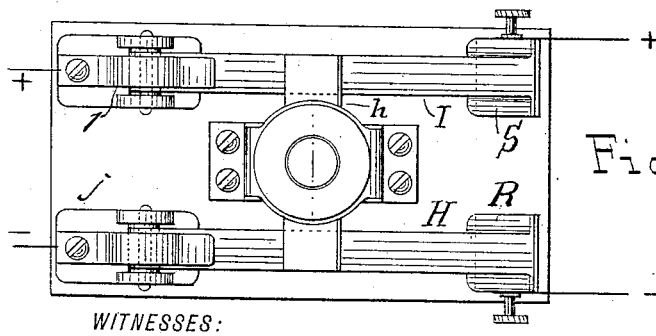
WITNESSES:
Walter E. Ward.
Seymour N. Harris.
INVENTOR
Wm. H. McDonald.
BY
Frederick W. Cameron.
ATTORNEY

UNITED STATES PATENT OFFICE.

WILLIAM H. McDONALD, OF ALBANY, NEW YORK.

ELECTRIC-STORAGE SYSTEM.

SPECIFICATION forming part of Letters Patent No. 389,935, dated September 25, 1888.

Application filed May 7, 1888. Serial No. 273,133. (No model.)

*To all whom it may concern:*

Be it known that I, WILLIAM H. McDONALD, a citizen of the United States, residing at Albany, in the county of Albany and State of New York, have invented a new and useful Electric-Storage System, of which the following is a specification.

My invention relates to an improvement in the method of storing and distributing electricity through lamp-circuits; and the object of my invention is to connect two or more lamp-circuits, each circuit supplied with a storage-battery, and connect the lamp-circuits together in such a manner that each of the storage-batteries will be drawn upon proportionately to supply the electricity used in the combined lamp-circuits, and also to supply a means of charging each of the storage-batteries. I attain these objects by the mechanism illustrated in the accompanying drawings, in which—

Figure 1 represents a storage system with three storage-batteries, each supplied with a lamp-circuit and each lamp-circuit connected with the others. Fig. 2 is a front elevation, Fig. 3 an end elevation, and Fig. 4 a plan, of my apparatus for breaking the circuit which is placed between the stations.

Similar letters refer to similar parts throughout the several views.

To the positive pole of a dynamo, A, I attach the wire $a$, which is connected with the positive plate of the battery placed at station B. The battery at the station B supplies the electricity used by the lamp-circuit, connected therewith by means of the wires K and N. The battery placed at station B is connected with the battery placed at station C by the wire $b$, and the battery placed at station C is connected to the lamp-circuit by means of the wires O and T. The battery placed at station C is connected with the battery placed at station D by the wire $c$, and which last-mentioned battery is connected with a lamp-circuit by means of the wires M and Q, and also with the negative pole of the dynamo A by means of the wire $d$.

The lamp-circuits heretofore mentioned are connected to each other by attaching the positive wire K to the circuit connected with the battery placed at station B, the wire L, which is also connected to the positive wires of the lamp-circuits, connected with the batteries C and D, and by attaching the negative wires of said lamp-circuits by the wire P. There is thus formed a connecting-circuit, which may also be supplied with lamps, and which will be furnished with electricity from each of the batteries placed at the storage-stations.

In order to charge successfully the batteries placed at the various stations in a storage system whose lamp-circuits are connected, it is quite necessary to provide some means for breaking the circuit on the wires which form the connection between the several lamp-circuits. The necessity for this is seen at once by an inspection of Fig. 1. If we suppose the negative wire $d$ to go directly to the negative pole of the dynamo, leaving out the solenoids E and F, and the wires L and P to be unbroken, the following would be the result when an attempt was made to charge the battery: The current would move along the wire $a$ to the battery placed at station B; but, finding there resistance to be overcome, it would pass along the wire K, and from thence along the wire L to wire M, and would arrive at the battery placed at station D, where it would be obliged to perform the work of charging that battery. After passing through the battery at D the current would pass along the wire $d$ to the negative pole of the dynamo, leaving the batteries placed at stations B and C entirely uncharged.

To provide for charging the batteries at stations B and C, as well as at D, positively, automatically, and simultaneously, and in such a manner that each of the aforesaid batteries will contribute toward supplying the electricity used on the lamp-circuits of the whole combined storage system, I arrange the following apparatus and connections:

Between the stations B and C and C and D, I place the solenoids E and F, respectively. To each solenoid is attached the negative wire $d$, passing from the battery at D to the negative pole of the dynamo A. I will describe the manner of operating my mechanism by my apparatus placed between stations C and D, or rather between the lamp-circuits connected to the batteries placed at the stations C and D, it being understood that the same method is applied and the same apparatus stationed and operated between the lamp-circuits connected with the batteries at B and C.

Into the core of the solenoid F, I place the bar G, carrying the link $g$, which in turn is connected to the cross-bar $h$, which is secured at each end to the connecting-bars H and I. The cross-bar $h$ is constructed of some non-conducting substance in such a manner that the connecting-bars H and I shall be insulated from each other. The connecting-bars H and I are usually constructed of copper, or may be made of any good conducting material, and each bar is hinged at one end to the base of the machine by lugs and bolt, as shown in the drawings, or in any suitable manner, and to the hinged end of each connecting-bar is connected, usually by means of a copper spring, $j$ and $l$, one of the wires of a circuit, the spring $j$ connecting the negative wire P to the connecting-bar H, and the spring $l$ connecting the positive wire L with the connecting-bar I. The connecting-bars H and I, when they are not operated on by the solenoid F, rest upon the copper blocks R and S, which are connected with the negative and positive wires of the circuit, and when the connecting-bars are thus resting upon the blocks R and S the current passes uninterruptedly along the positive and negative wires of the lamp-circuit, connecting all the lamp-circuits of my storage system.

To show the operation of my system of storing the batteries placed at the various stations, we will suppose the dynamo to generate a current of electricity which will pass along the wire $a$ and the wire K and wire L, the connecting-bars resting upon their copper blocks along wire M, to the battery stationed at D, which battery will become charged, when the electricity will pass out along the negative wire $d$ and come into contact with the solenoid F, which will cause the connecting-bars H and I to leave their copper blocks R and S, being lifted up by the bar G, which is drawn into the core of the solenoid, and the current passing from the dynamo to the battery at D is broken. Simultaneously with the breaking of the current passing along the wire L between stations C and D the solenoid E will cause the circuit on the wire L to be broken between stations B and C, which will cause the current to flow through the battery stationed at B, charging that battery and pass on to the battery placed at station C, which battery also will become charged. When all the batteries at the storage system have been charged and the dynamo ceases to operate, a current will no longer pass along the negative wire $d$. Therefore the connecting-bars will no longer be raised from their copper supports, but will make the connection along the intermediate lamp-circuit.

Now suppose the lamps to be called into use and the battery at station C, for instance, should become out of order and fail to furnish electricity for the lamps on its circuit. The batteries D and E will be called on at once to furnish the electricity necessary for the lamp-circuit usually supplied by the battery at C, because the positive wire L is connected with the positive wire K, connected with the battery at B, and with the positive wire M of the battery D, the negative wire P being also connected with the negative wire N of the battery at B and with the negative wire Q of the battery D. These batteries being all connected with the same lamp-circuits they all contribute their share toward supplying the electricity used on the combined circuits of a storage system. The storage-batteries act as reservoirs and the wires running from them as conduits, and each is drawn upon equally, leaving the contents in a state of equilibrium.

For the purpose of supplying electric light to different portions of a town or city it is very convenient to have at frequent intervals storage-batteries, which act as depots of supplies and from which the lamps in the immediate neighborhood receive their proportion of the electric fluid. The advantage of this system is also realized when it is considered that these batteries may be charged in the daytime and by a dynamo much smaller than would be required if it was necessary to furnish the electricity at once for all the lights on the whole circuit. The objection that has always been raised to the use of storage-batteries is that the lamps upon the circuit to which a storage-battery is attached are wholly dependent for their supply of electricity upon that battery, and if there should happen to be an unusual demand for electricity or by any chance the battery should be only partially charged or any accident should happen to the battery the whole lamp-circuit would be at once cut off, and in that district darkness would reign supreme. By my storage system it is impossible for any part of the combined circuits to be placed in this condition while there is any electricity left in any of the storage-batteries.

I do not limit myself to any particular number of stations or to any particular manner of generating electricity, although I have shown but three stations and have referred to a dynamo.

What I claim as my invention, and desire to secure by Letters Patent, is—

1. An electric-storage system composed of two or more lamp-circuits, each of which is supplied with a storage-battery, and each of which lamp-circuits is connected with the other lamp circuit or circuits by an intermediate circuit provided with a means for breaking the current on the intermediate circuit between the storage-batteries, substantially as described, and for the purpose set forth.

2. An electric-storage system composed of two or more lamp-circuits, each of which is supplied with a storage-battery, and each of which lamp-circuits is connected with the other lamp circuit or circuits by an intermediate circuit provided with the connecting-bars H I, connected to the core-bar of a solenoid, said solenoid connected to a wire of the charging-circuit, and said connecting-bars placed between the storage-batteries B and C and C and D, all substantially as described, and for the purpose set forth.

WM. H. McDONALD.

Witnesses:
WALTER E. WARD,
FREDERICK W. CAMERON.